(12) United States Patent
Cai et al.

(10) Patent No.: US 11,539,584 B2
(45) Date of Patent: Dec. 27, 2022

(54) AUTOMATIC AND DYNAMIC ADAPTATION OF GROUPING IN A DATA PROCESSING SYSTEM

(71) Applicant: Telefonaktiebolaget LM Ericsson (publ), Stockholm (SE)

(72) Inventors: Xuejun Cai, Täby (SE); Jiangfeng Du, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 24 days.

(21) Appl. No.: 17/297,360

(22) PCT Filed: Nov. 27, 2018

(86) PCT No.: PCT/SE2018/051220
§ 371 (c)(1),
(2) Date: May 26, 2021

(87) PCT Pub. No.: WO2020/111989
PCT Pub. Date: Jun. 4, 2020

(65) Prior Publication Data
US 2022/0029883 A1     Jan. 27, 2022

(51) Int. Cl.
*H04L 41/0816* (2022.01)
*H04L 41/042* (2022.01)
(Continued)

(52) U.S. Cl.
CPC ........ *H04L 41/0816* (2013.01); *H04L 41/042* (2013.01); *H04L 41/0826* (2013.01);
(Continued)

(58) Field of Classification Search
CPC ............... H04L 41/0816; H04L 41/042; H04L 41/0826; H04L 41/12; H04L 41/0893;
(Continued)

(56) References Cited

U.S. PATENT DOCUMENTS

| | | | |
|---|---|---|---|
| 8,041,773 B2 | 10/2011 | Abu-Ghazaleh et al. | |
| 8,675,672 B1* | 3/2014 | Bao .......................... | H04L 45/46 370/408 |

(Continued)

FOREIGN PATENT DOCUMENTS

| | | |
|---|---|---|
| EP | 1159681 B1 | 11/2003 |
| EP | 1816805 A1 | 8/2007 |
| EP | 2629454 A1 | 8/2013 |

OTHER PUBLICATIONS

International Search Report and the Written Opinion of the International Searching Authority, issued in corresponding International Application No. PCT/SE2018/051220, dated Jul. 1, 2019, 11 pages.

(Continued)

*Primary Examiner* — Tonia L Dollinger
*Assistant Examiner* — Joseph M Cousins
(74) *Attorney, Agent, or Firm* — Rothwell, Figg, Ernst & Manbeck, P.C.

(57) ABSTRACT

A system and method to adapt the grouping between a plurality of nodes in a data processing system. In one embodiment, a first leader node (320) in a data processing system (300) is configured to determine (815) a cost map within a first group of nodes (310), calculate (820) costs between the first leader node (320) and first member nodes (330) based on the cost map, determine (830) a candidate member node (330A) from the first member nodes (330), query (840) other leader nodes (350, 380) to accept a transfer of the candidate member node (330A), receive (850) a first transfer response from a second leader node (350) to accept the transfer to a second group of nodes (340), initiate (860) a transfer of and receive (865) an acknowledgement for the transfer of the candidate member node (330A) to the second group of nodes (340).

21 Claims, 9 Drawing Sheets

(51) Int. Cl.
*H04L 41/0826* (2022.01)
*H04L 41/12* (2022.01)
*H04L 41/0893* (2022.01)
*H04L 45/122* (2022.01)

(52) U.S. Cl.
CPC .......... *H04L 41/12* (2013.01); *H04L 41/0893* (2013.01); *H04L 45/122* (2013.01)

(58) Field of Classification Search
CPC . H04L 45/122; G06F 2209/505; G06F 9/5061
See application file for complete search history.

(56) References Cited

U.S. PATENT DOCUMENTS

| | | |
|---|---|---|
| 9,986,483 B1 * | 5/2018 | Balmakhtar .... H04W 36/00837 |
| 2002/0089982 A1 | 7/2002 | Novaes |
| 2006/0084438 A1 * | 4/2006 | Kwon ................... H04W 36/30 455/436 |
| 2007/0121667 A1 | 5/2007 | Hare et al. |
| 2008/0175169 A1 | 7/2008 | Deb et al. |
| 2009/0083390 A1 | 3/2009 | Abu-Ghazaleh et al. |

OTHER PUBLICATIONS

Ganesh et al. "HiScamp: self-organizing hierarchical membership protocol" Proceedings of the 10th workshop on ACM SIGOPS European workshop, Jul. 2002, pp. 133-139, https://doi.org/10.1145/1133373.1133398.

* cited by examiner

AUTOMATIC AND DYNAMIC ADAPTATION OF GROUPING IN A DATA PROCESSING SYSTEM

CROSS REFERENCE TO RELATED APPLICATION(S)

This application is a 35 U.S.C. § 371 National Phase Entry Application from PCT/SE2018/051220, filed Nov. 27, 2018, designating the United States, the disclosure of which is incorporated herein by reference in its entirety.

TECHNICAL FIELD

The present disclosure is directed, in general, to the field of cloud computing and, more specifically, to a system and method to adapt the grouping between a plurality of nodes in a data processing system.

BACKGROUND

Cloud infrastructures of servers and associated memory are usually formed with a large number of interconnected nodes, which can be either physical or virtualized nodes. Basically, there are two types of structures for their interconnection. In a flat structure, all nodes are in the same group. This provides easy management of communication among nodes, although scalability with the number of nodes might be an issue. In a hierarchical structure, nodes are organized into different groups. Such a structure is scalable in size as the number of nodes grows. A node in a hierarchical structure communicates with other nodes in the same group.

A data center often includes a large number of nodes, possibly up to hundreds of thousands. To enable efficient communication between nodes and provide services to upper layer applications, the nodes in the data center often know the other nodes in the data center and their availability. This is called membership management, which is the basis for resource placement or for scheduling of upper layer tasks.

In general, membership management can be divided into two categories, namely, centralized and decentralized. In centralized membership management, there is a central entity that maintains the information and status of the nodes, as described in an article entitled "Large-Scale Cluster Management at Google with Borg," by Abhishek Verma, Luis Pedrosa, Madhukar Korupolu, David Oppenheimer, Eric Tune, and John Wilkes, published in the Proceedings of the Tenth European Conference on Computer Systems (EuroSys 2015), which is incorporated herein by reference. The described process is efficient, but scalability is limited as the central entity is usually a single point of failure. All nodes in the system communicate with the central entity.

In decentralized membership management, each node maintains the information and status of other nodes, which eliminates the centralized single point of failure. The decentralized membership management, however, still faces a scalability issue because each node needs to communicate with the other nodes in the system to retrieve their information and status. Such communication overhead can increase exponentially.

To tackle the scalability issue, a gossip-based protocol is often used in decentralized membership management. For example, SWIM protocol, as described in an article entitled "SWIM: Scalable Weakly-consistent Infection-style process group Membership Protocol," by A. Das, I. Gupta, and A. Motivala, in the Proceedings of the 2002 International Conference on Dependable Systems and Networks, pp. 303-312, which is incorporated herein by reference, is used by the Serf framework: Serf: Decentralized Cluster Membership, Failure Detection, and Orchestration https://www.serf.io/docs/internals/index.html. In gossip protocols, the information is spread and disseminated by gossip. It basically works by flooding information in the data processing system, but only to a selected set of neighbor nodes, so the communication load is bounded.

The gossip protocol-based membership management also has several limitations. For example, convergence of information dissemination is relatively slow because multiple rounds of gossip can occur for a piece of information being flooded to the nodes in the system.

There have been other attempts to address membership management such as U.S. Pat. No. 8,041,773 entitled "Automatic Clustering for Self-Organizing Grid," to Abu-Ghazaleh, et al. (the "'773 Patent"). The '773 Patent describes a link-delay sensitive overlay structure to organize nodes based on proximity of one node to one another. The overlay process provides a variable-size set of promising candidate nodes that can be used as a cluster, or can be tested further to improve selection. (Column 3, lines 46-61.) The '773 Patent also describes automatic node clustering that employs measurements to determine all-pair network properties between nodes, and then employs a graph clustering algorithm to extract candidate virtual clusters of a desired size. (Column 6, lines 21-28.) That being said, the '773 Patent fails to facilitate communication between the leader nodes of different clusters to evaluate communication and computing costs of an individual or sets of nodes within a data processing system to efficiently position the node(s) within a cluster of the data processing system.

It is highly desirable, therefore, to efficiently maintain group membership of nodes in a data processing system such as a data center. A membership management process that addresses the aforementioned issues can enhance the efficiency of communication among a plurality of nodes in a distributed data processing system such as a data center, or the like.

SUMMARY

These and other problems are generally solved or circumvented, and technical advantages are generally achieved, by advantageous embodiments of the present disclosure for a system and method to adapt the grouping between a plurality of nodes in a data processing system. In one embodiment, a first leader node of a first group of nodes in communication with a plurality of leader nodes in a distributed data processing system is configured to (in conjunction with processing circuitry) determine a cost map including computational and/or communication costs within the first group of nodes, calculate costs between the first leader node and first member nodes within the first group of nodes based on the cost map, and determine a candidate member node from the first member nodes if the costs between the first leader node and the candidate member node exceeds a threshold. The first leader node is also configured to query the plurality of leader nodes to accept a transfer of the candidate member node, and receive a first transfer response from a second leader node of the plurality of leader nodes to accept the transfer of the candidate member node to a second group of nodes directed by the second leader node. The first leader node is also configured to initiate a transfer of the candidate member node to the second group of nodes if the first leader node accepts the transfer thereto, and receive an acknowledgement of the transfer of the candidate member node to the second group of nodes.

In another embodiment, a first leader node (a transfer leader node) of a first group of nodes in communication with a second leader node of a second group of nodes in a distributed data processing system is configured to (in conjunction with processing circuitry) receive a query from the second leader node to accept a transfer of a candidate member node of second member nodes of the second group of nodes to the first group of nodes, and provide a transfer response to the second leader node if the first leader node accepts the transfer of the candidate member node to the first group of nodes. The first leader node is also configured to receive an instruction to transfer the candidate member node to the first group of nodes, and provide an acknowledgement of the transfer of the candidate member node to the first group of nodes.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules associated with a system and method to adapt the grouping between a plurality of nodes in a data processing system (e.g., a distributed data processing system).

A system will be described herein with respect to exemplary embodiments in a specific context, namely, a data center formed with groups of a plurality of nodes. While the principles will be described in the environment of a data center, any environment such as a redundant computing facility formed with a plurality of nodes (e.g., servers) in a distributed communication environment that may benefit from such a system and method that enables these functionalities is well within the broad scope of the present disclosure.

Figure 1:
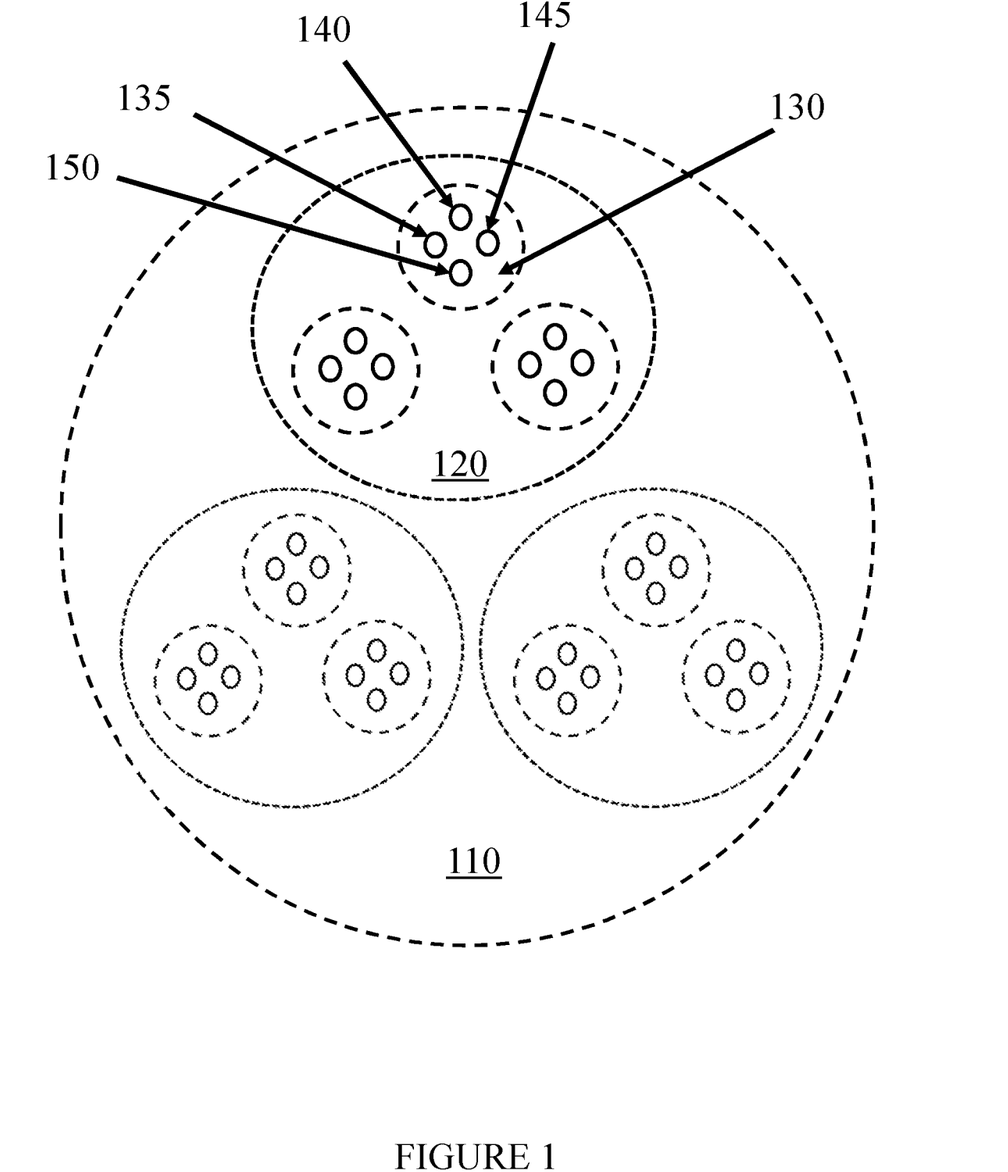
FIG. 1 illustrates a system level diagram of an embodiment of a data processing system.

Turning now to FIG. 1, illustrated is a system level diagram of an embodiment of a data processing system (e.g., a data center 110). To achieve both scalability and efficiency, a self-organized, decentralized, and hierarchical membership management arrangement may be employed for node clustering (or grouping) in a data center 110. As shown in FIG. 1, each node, such as nodes 135, 140, 145, 150 belongs to a group of nodes, such as a first group of nodes 130, and can communicate directly with other member nodes in this first group of nodes 130. In each group of nodes, there is a leader node such as the first leader node 135 that is responsible for updating the membership (e.g., leave and join) of the first group of nodes 130. The first leader node 135 is also a member node of another group of nodes 120 in a higher layer. The number of layers of the data processing system can be determined by a pre-defined parameter. The group of nodes to which a member node belongs is determined when the member node boots up and joins a group of nodes according to some criterion.

A problem with forming such groups of nodes is that group membership becomes static. Most changes are made in group membership when a member node is in a fault condition or leaves the group of nodes. The conditions of the member nodes and networks, however, are always dynamically changing. The criteria to determine the group of nodes to which a member node is a member can be quite different for various scenarios. There has been no unified approach. For example, some group of nodes are topology based for membership and some are network latency based for membership.

To provide dynamic group adaptation, membership of each group of nodes may be adjusted dynamically according to a real-time cost map. Accordingly, a member node can be transferred from one group of nodes to another group of nodes. The cost map can be translated from various metrics or properties, such as the physical network topology. Measured network distance (or latency) between member nodes can be easily observed as a grouping cost. Other properties for grouping can also be considered and are contemplated herein. The selection metric for group membership may be based on requirements from applications that use the group of nodes. Adaptation of group membership by a member node becomes dynamic by calculating on a continuing basis the actual cost of a metric within each group of nodes, and altering group membership accordingly.

When a node boots up, a broadcast message is sent to all leader nodes in the data processing system to indicate its intent to join the system. When the leader nodes receive such a message, they decide if a positive reply will be sent to the querying node. If there is any positive reply received by the node, the node determines the group of nodes to be joined according to some criterion such as the order of the message received, or some attribute contained in the reply. The hierarchical structure can improve scalability as most messages are communicated within the group of nodes. It is also decentralized and does not have a single point of failure. The leader node of each group of nodes is responsible for updating the membership status. All other member nodes in the group of nodes have similar, if not identical, membership information as the leader node. A failure detection and leader election mechanism can enhance (e.g., guarantee) a timely discovery of a failed leader node and a reelection of a new leader node.

In hierarchical structure-based membership management mechanisms, the group membership is often static. The group of nodes to which a member node belongs is determined when the member node joins the system according to a specific criterion. The member node can be removed from the group of nodes when it is in fault or leaves the system. For example, in HiScamp, as described in an article entitled "HiScamp: A Self-Organizing Hierarchical Membership Protocol," by Ayalvadi J. Ganesh, Anne-Marie Kermarrec, and Laurent Massoulié, in the Proceedings of the 10th workshop on ACM SIGOPS, European workshop (EW 10), ACM, New York, N.Y., USA, (2002), pp. 133-139, which is incorporated herein by reference, a self-organizing hierarchical membership protocol is used. When a new node asks to join the data processing system, the network distance (latency) between the new node and other nodes is used to determine if the new node will be in the same cluster or group as the other nodes. However, since the conditions of the nodes and network in the data processing system are usually dynamic, the assigned group of nodes may become less optimal over time. In addition, a criterion to determine the group of nodes assigned to the member nodes is different for various scenarios. There is no unified approach. For example, some are topology based, and some are network latency based.

A mechanism is employed to automatic modify the membership of a group of nodes dynamically according to dynamic properties or conditions of the nodes and/or networks in the data processing system. A member node can be transferred from one group of nodes to another group of nodes when some conditions are met. A cost map can be used to reflect the real-time conditions and relationship among the member nodes. For example, the cost map could reflect the underlying topology of the network, the network latency among the nodes, or any other dynamic property of the nodes in the data processing system. The leader node in each group of nodes may be responsible for querying the cost map periodically to measure the cost of the member nodes in the group of nodes. If the cost of a member node exceeds a pre-defined threshold, the leader node can trigger a migration process to determine if transferring the member node into another group of nodes will optimize or at least improve costs. If yes, the leader node of the current group of nodes coordinates with the leader node of the target group of nodes to perform the transfer. Such query and transferring is performed continually in the data processing system to optimize, or at least improve, group membership according to dynamic properties reflected in the cost map.

Figure 2:
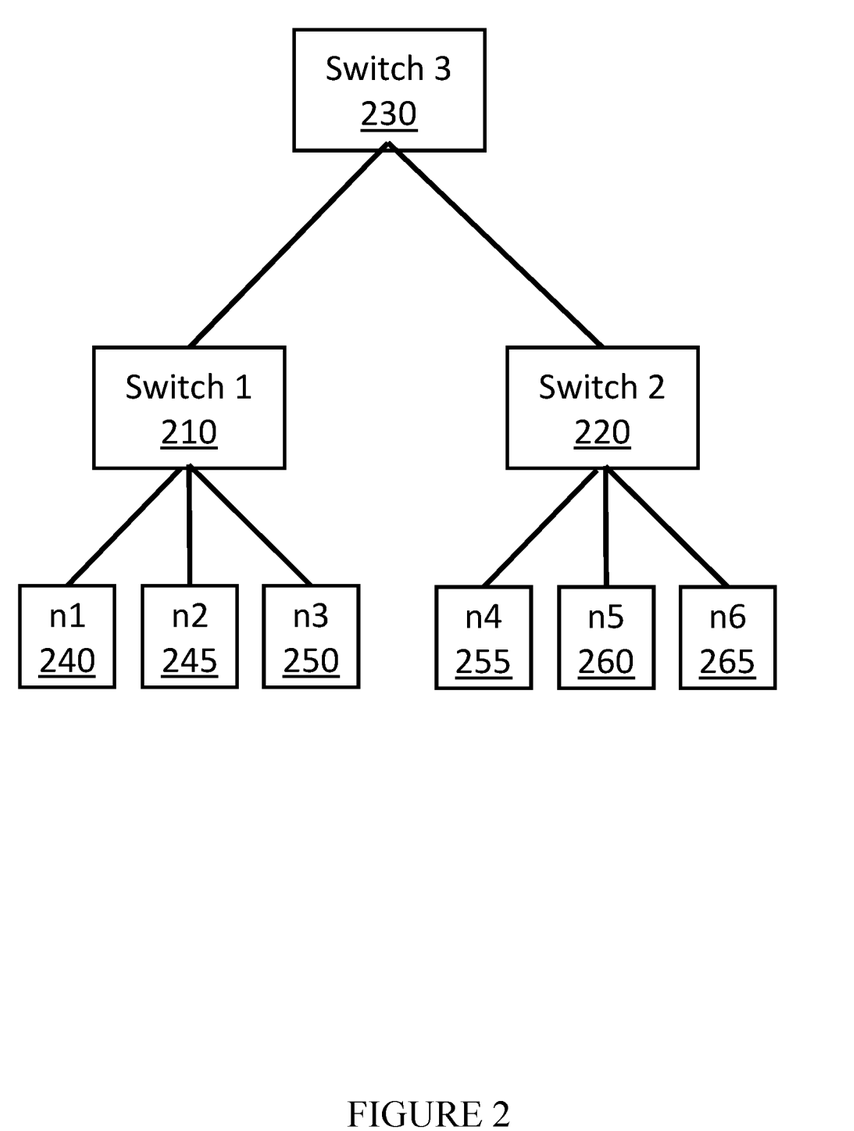
FIG. 2 illustrates block diagram of an embodiment of a hierarchically organized structure of a data processing system.

Turning now to FIG. 2, illustrated is block diagram of an embodiment of a hierarchically organized structure of a data processing system. The data processing system includes switches such as first, second and third switches 210, 220, 230 and a plurality of nodes such as first, second, third, fourth, fifth and sixth nodes 240, 245, 250, 255, 260, 265. In this hierarchically organized structure, each group includes a set of nodes. In each group of nodes, there is a leader node which usually is the first node of this group of nodes or can be elected according to a specific algorithm (e.g., the member node which has highest identifier ("ID") can become the leader node). The leader node itself could also be part of another group of nodes in a higher layer. FIG. 2 illustrates a two-layer structure, but there may be more than two layers. In the following, a two-layer structure is assumed. It is to be noted that a multi-layer structure with more layers can be used.

Figure 3:
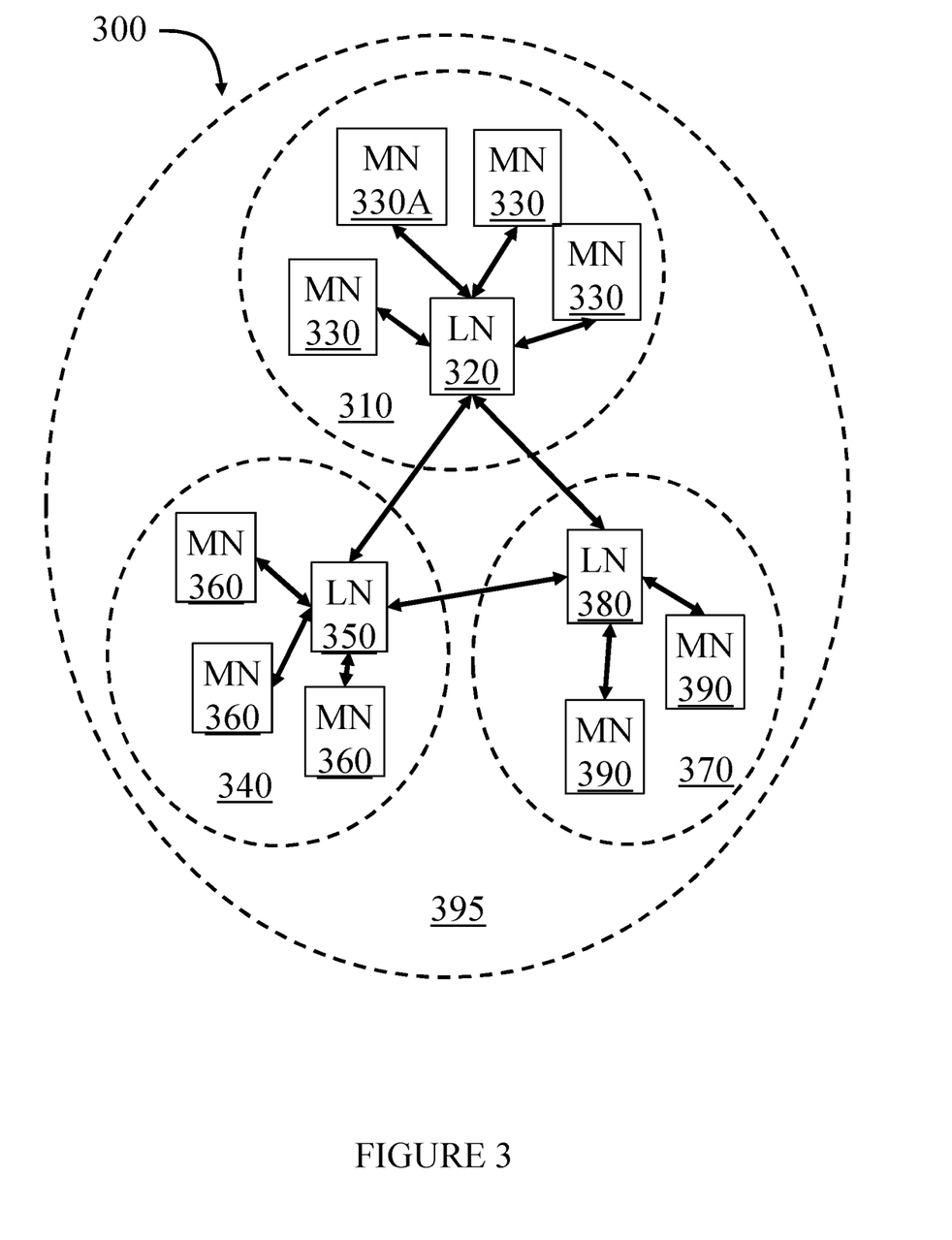
FIGS. 3 and 4 illustrate system level diagrams of embodiments of hierarchical membership structures in a data processing system.

Turning now to FIG. 3, illustrated is a system level diagram of an embodiment of a hierarchical membership structure in a data processing system 300. As illustrated in FIG. 3, a first group of nodes 310 includes a first leader node 320 in communication with first member nodes (collectively designated 330 including a candidate member node designated 330A). A second group of nodes 340 includes a second leader node 350 in communication with second member nodes (collectively designated 360). A third group of nodes 370 includes a third leader node 380 in communication with third member nodes (collectively designated 390). In addition, the first, second and third leader nodes 320, 350, 380 are in communication with one another. The first, second and third group of nodes 310, 340, 370 are also part of another group of nodes 395 at a higher layer. The leader nodes are designated "LN" and the member nodes are designated "MN".

A process for managing group membership employs a cost map generator to measure/collect information in a consistent manner about member nodes (e.g., the first group of nodes 310) such as node topology, measured network latency, or any other desired metric. A cost map may be updated employing this information. The current group leader (e.g., the first leader node 320) reads the cost map and calculates the cost distance between itself and the first member nodes 330 of the first group of nodes 310. If the cost distance between the first leader node 320 and a first member node 330 (the candidate member node 330A) in the first group of nodes 310 exceeds a threshold, a member node transfer request is triggered. The first leader node 320 then selects a plurality of leader nodes such as the second and third leader nodes 350, 380 to query to accept a transfer of the candidate member node 330A. The selection of the plurality of leader nodes to query for the transfer may be based on a distance from the first leader node 320.

The first leader node 320 sends a transfer request to the second and third leader nodes 350, 380. The second and third leader nodes 350, 380 calculate costs between itself and the candidate member node 330A to be transferred. If certain requirements are met, the second leader node 350 and/or the third leader node 380 sends a transfer response(s) to accept the transfer of the candidate member node 330A to the second group of nodes 340 and third group of nodes 370, respectively. The first leader node 320 evaluates received transfer response(s). If the first leader node 320 accepts a transfer (e.g., a transfer response meets a criterion from the second leader node 350), the first leader node 320 initiates a transfer to the second group of nodes 340, to which the second leader node 350 acknowledges the transfer to the second group of nodes 340 (see, also, FIG. 8 and the related description). Other actions such as group merging, initially joining a group of nodes, and other aspects can follow a similar process.

Figure 4:
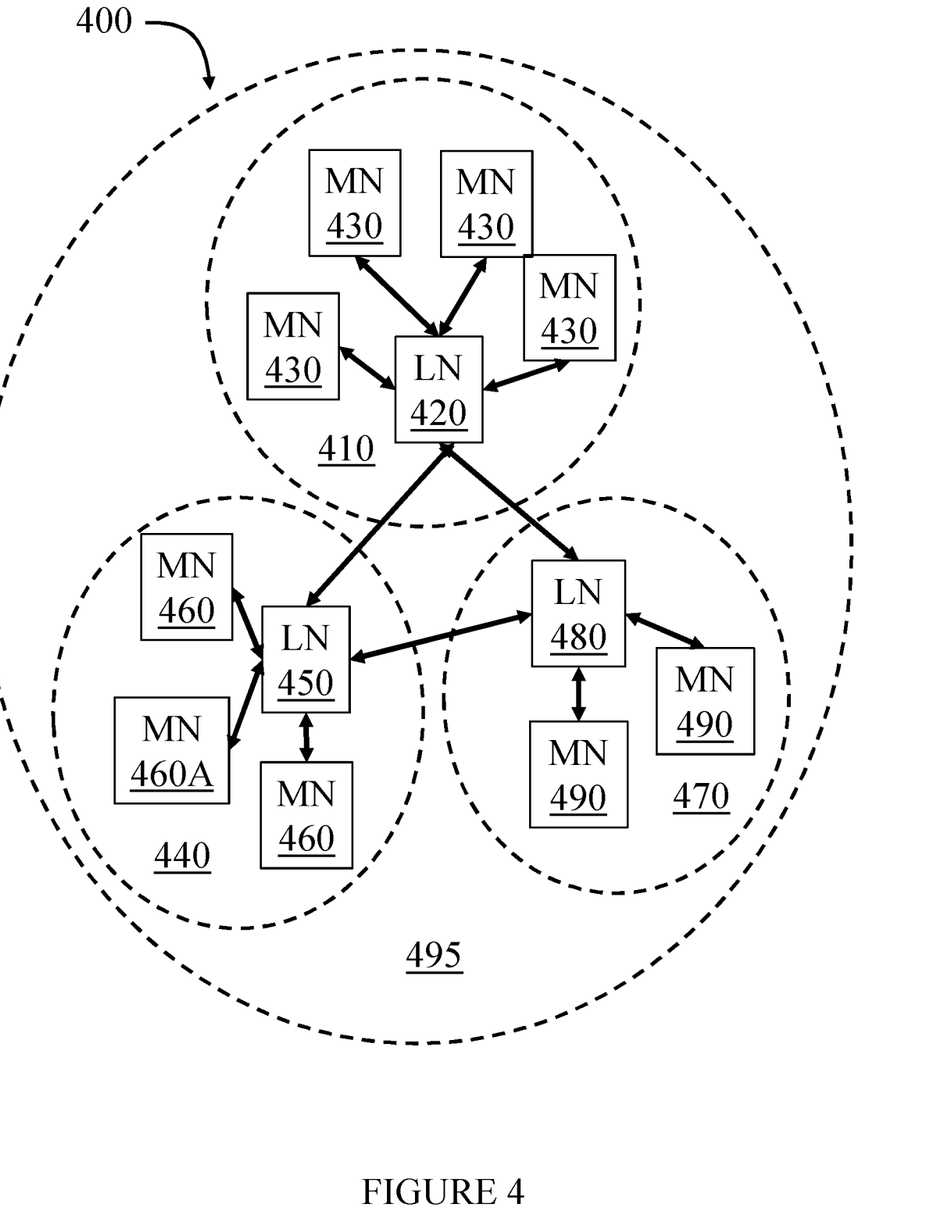

Turning now to FIG. 4, illustrated is a system level diagram of an embodiment of a hierarchical membership structure in a data processing system 400. As illustrated in FIG. 4, a first group of nodes 410 includes a first leader node 420 in communication with first member nodes (collectively designated 430). A second group of nodes 440 includes a second leader node 450 in communication with second member nodes (collectively designated 460 including a candidate member node 460A). A third group of nodes 470 includes a third leader node 480 in communication with third member nodes (collectively designated 490). In addition, the first, second and third leader nodes 420, 450, 380 are in communication with one another. The first, second and third group of nodes 410, 440, 470 are also part of another group of nodes 495 at a higher layer. The leader nodes are designated "LN" and the member nodes are designated "MN".

In this case, the first leader node 420 and the third leader node 480 are adapted to accept a transfer of the candidate member node 460A from the second group of nodes 440 to the first group of nodes 410 and the third group of nodes 470, respectively. For purposes of illustration, FIG. 9 and the related description demonstrate the transfer of the candidate member node 460A of the second group of nodes 440 to the first group of nodes 410.

Figure 5:
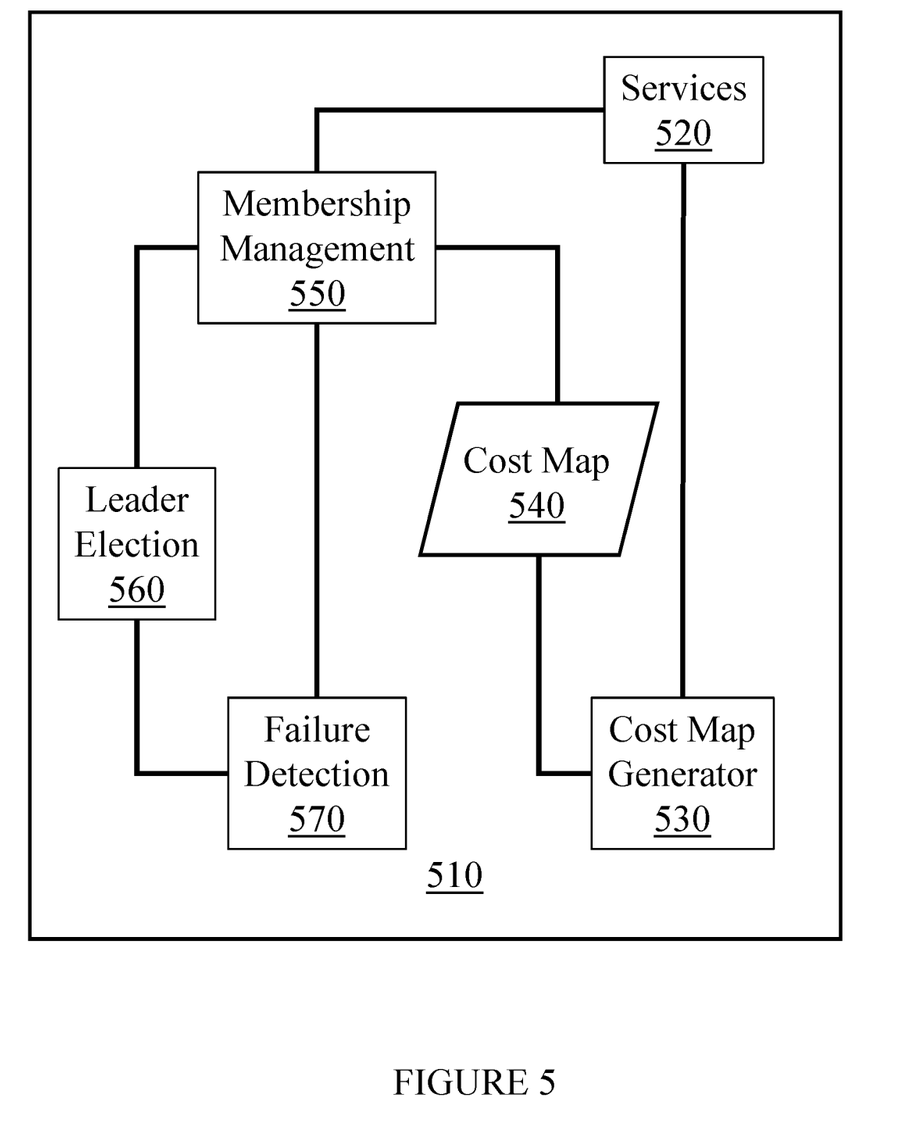
FIGS. 5 and 6 illustrate block diagrams of embodiments of a node employable in a data processing system.

Turning now to FIG. 5, illustrated is a block diagram of an embodiment of a node 510 employable in a data processing system. A cost services subsystem 520 utilizes membership management to perform selected tasks. For example, task scheduling or a Hadoop service (an operating system directed at operations in multiple data centers) in the data processing system can use membership information to query for suitable nodes in the system that can fulfill a task requested by applications/services. On another hand, the cost services subsystem 520 can also influence a cost map generator 530 in the development of a cost map 540, so that the cost map 540 can better reflect the properties that are useful to the applications/services.

The cost map 540 can be used to reflect dynamic properties or relationships between the nodes in the data processing system. For example, the costs could represent the network latency between any pair of nodes in the data processing system. Vivaldi network coordinates have been used to calculate the cost of nodes in the data processing system, as described by "Practical, Distributed Network Coordinates," by Russ Cox, Frank Dabek, Frans Kaashoek, Jinyang Li, and Robert Morris, SIGCOMM Comput. Commun. Rev. 34, 1 (January 2004), pp. 113-118, which is incorporated herein by reference. Cox, et al. use a network tomography system to compute network coordinates for nodes in the cluster or group of nodes. These coordinates allow network latency to be estimated as the cost between any two nodes using a calculation.

Another example is using cost to represent a physical topology such as pairs of nodes having low (e.g., minimal) costs will indicate they are in the same rack or close proximity in a data center. FIG. 5 illustrates a node 510 employable in a data center topology. The cost map 540 showing costs between pairs of nodes (n1, . . . , n6) can be represented as illustrated below in TABLE 1 below.

TABLE 1

Costs between Pairs of Nodes

|    | n1 | n2 | n3 | n4 | n5 | n6 |
|----|----|----|----|----|----|----|
| n1 | —  | 0  | 0  | 2  | 2  | 2  |
| n2 | 0  | —  | 9  | 2  | 2  | 2  |
| n3 | 0  | 0  | —  | 2  | 2  | 2  |
| n4 | 2  | 2  | 2  | —  | 0  | 0  |
| n5 | 2  | 2  | 2  | 0  | —  | 0  |
| n6 | 2  | 2  | 2  | 0  | 0  | —  |

The costs can also be used to denote the similarity of resources available in the nodes, for instance, those nodes with similar central processing unit ("CPU") capacity (or other hardware attributes) and have low to minimal costs therebetween.

The cost map generator 530 generates and updates the cost map 540 continually over time, and may be in a centralized location or can be distributed to each node 510. The cost map 540 could also be implemented as centralized or distributed. In FIG. 5, the cost map generator 530 is implemented in a distributed way, i.e., it runs in all nodes in the data processing system. The cost map 540 is stored by the cost map generator 530 in the same node.

As shown in FIG. 5, in addition to cost map 540 and cost map generator 530, the node 510 also includes a membership management subsystem 550, a leader election subsystem 560, and a failure detection subsystem 570. The membership management subsystem 550 is used to maintain the information about the member nodes of the group of nodes. The leader election subsystem 560 is used to elect a new leader node when the current leader node of the group of nodes fails or leaves the group. The failure detection subsystem 570 is used to monitor the status of other member nodes in the group of nodes. In each group of nodes, the leader node is generally responsible for the membership adaption, but functions associated therewith may be distributed within or without the group of nodes.

Figure 6:
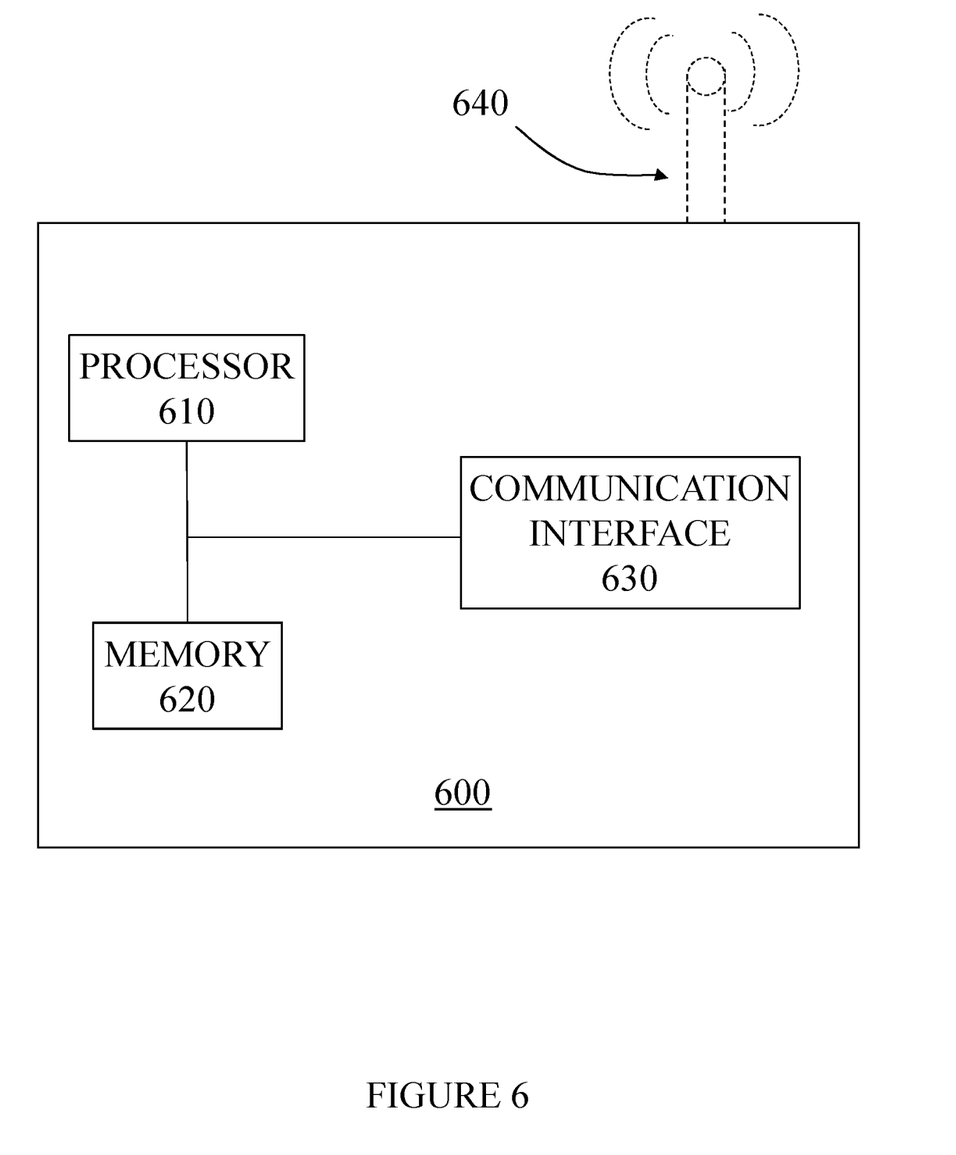

Turning now to FIG. 6, illustrated is a block diagram of an embodiment of a node 600 employable in a data processing system. The node 600 includes a processor (or processing circuitry) 610, a memory 620 and a communication interface 630. The node 600 may also include an antenna(s) 640 depending on the type of device such as a server with wireless communication capability. In particular embodiments, some or all of the functionality described herein may be provided by, without limitation, a user equipment, machine type communication ("MTC") and machine-to-machine ("M2M") devices, a radio base station, a radio network controller, a relay station, and a data center (e.g., computer(s) that form a data center).

The functionality of the node 600 may be provided by the processor 610 executing instructions stored on a computer-readable medium, such as the memory 620 shown in FIG. 6. Alternative embodiments of the node 600 may include additional components (such as the interfaces, devices and circuits mentioned above) beyond those shown in FIG. 6 that may be responsible for providing certain aspects of the device's functionality, including any of the functionality to support the solution described herein.

The processor 610 (or processors), which may be implemented with one or a plurality of processing devices, perform functions associated with its operation including, without limitation, precoding of antenna gain/phase parameters, encoding and decoding of individual bits forming a communication message, formatting of information and overall control of a respective node 600. Exemplary functions related to management of communication resources include, without limitation, hardware installation, traffic management, performance data analysis, configuration management, security, billing and the like. The processor 610 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The processor 610 may include one or more of radio frequency ("RF") transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset.

The processor 610 may be configured to perform any operations described herein. The operations as performed by the processor 610 may include processing information obtained by the processor by, for example, converting the obtained information into other information, comparing the obtained information or converted information to information stored in the respective device, and/or performing one or more operations based on the obtained information or converted information, and, as a result of the processing, making a determination.

The memory 620 (or memories) may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memory 620 may include program instructions or computer program code that, when executed by an associated processor, enable the respective node 600 to perform its intended tasks. Of course, the memory 620 may form a data buffer for data transmitted to and from the same. Exemplary embodiments of the system, subsystems, and modules as described herein may be implemented, at least in part, by computer software executable by the processor 610, or by hardware, or by combinations thereof.

The communication interface 630 modulates information onto a carrier waveform for transmission by the respective node 600 to another node. The respective communication interface 630 also demodulates information received from another node for further processing. The communication interface 630 can support duplex operation for the respective node 600, and supports communication with a core network.

The antenna 640 (antennas), when applicable, may be any type of antenna capable of transmitting and receiving data and/or signals wirelessly. In some embodiments, the antenna 640 may include one or more omni-directional, sector or panel antennas operable to transmit/receive radio signals between, for example, 2 gigahertz ("GHz") and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. While the antenna 640 facilitates wireless communication for the node 600, the node 600 may also communicate via a wired communication path via the communication interface 630 and, in such instances, the antenna 640 may not be necessary. The subsystems as introduced above with respect to FIG. 5 may be embodied in the node 600 performed by, for instance, the processor 610 in conjunction with the memory 620.

Figure 7:
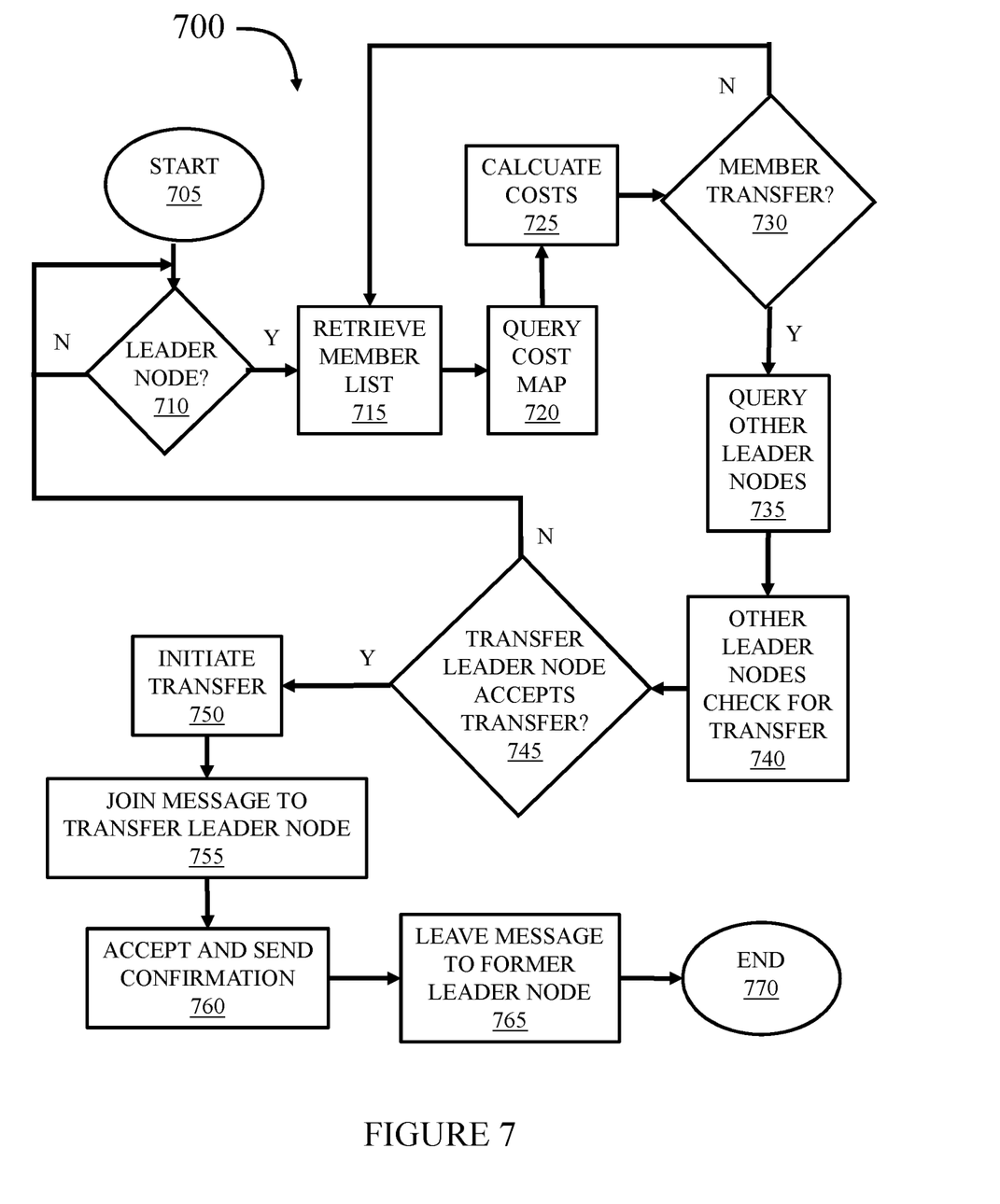
FIGS. 7 to 9 illustrate flow diagrams of embodiments of methods of operating a data processing system.

Turning now to FIG. 7, illustrated is a flow diagram of an embodiment of a method 700 of operating a data processing system. In each node, a process as a part of a membership management system is responsible for group membership adaption. The method 700 illustrated in FIG. 7 depicts how the adaption is performed beginning with a start step or module 705. At a decisional step or module 710, the method 700 determines if the node is a leader node. If the node is not a group leader node, then the method 700 returns to the start step or module 705, otherwise the method 700 continues to the step or module 715.

At the step or module 715, the leader node retrieves or updates (e.g., periodically) a membership list of the nodes (member nodes) in the group of nodes. The leader node then queries a cost map, in a step or module 720, to obtain the costs between the leader node and member nodes (or set thereof) of the group of nodes. The set of member nodes may be selected randomly. The number of the selected member nodes may be pre-defined or determined according to the actual size of the group of nodes, for instance, as a fraction of the size of the group of nodes. The cost may be generated employing a cost map in an aggregated way (e.g., the average value over a past half hour) to reduce the fluctuation of change of the group adaption.

Based on a criterion (e.g., a pre-defined algorithm) and the cost map, the leader node calculates the costs of the leader node and the member nodes (or set thereof) of the group of nodes, at a step or module 725, and determines if a member node should be transferred at a decisional step or module 730. As an example, let $S_{min}$ denote the minimum group size that a leader node will initiate a transfer of a member node. Let '$c_{ij}$' denote the cost between node i and j; let 'r' denote a threshold cost between the leader node and other member nodes in the group of nodes, wherein 'r' is a pre-defined parameter that controls the threshold that triggers the adaption. Let $S_g$ denote the current size of the group of nodes g. Then the leader node will check if ($S_g > S_{min}$) and ($c_{xl} > r$) for the selected member nodes. If the criterion is met for a selected member node (a candidate member node), the leader node can decide to trigger a transfer of the candidate member node as determined by the decisional step or module 730, otherwise the method 700 returns to the step or module 715.

If the leader node has decided to transfer the candidate member node, then the leader node queries a plurality of leader nodes to accept the transfer of the candidate member node at a step or module 735. The query may contain the identifier of the candidate member node to be transferred, and possibly other information such as the cost between the candidate member node and its current leader node. A timer ($t_q$) could be started after the queries are sent out.

Upon receiving the request, the plurality of leader nodes check to determine if they will accept the transfer request at a step or module 740. For example, the plurality of leader nodes may check if ($S_g < S_{max} - 1$) and ($c_{ml} < r - b$), where $S_g$ denotes the size of the group of nodes g, $S_{max}$ denotes the maximum size of the group of nodes, $c_{ml}$ is the cost between the candidate member node m and the plurality of leader node(s) l; r is the threshold cost; and b is a parameter to control how easily the adaption shall be. The higher b, the plurality of leader nodes are less likely to accept a transfer request.

When the timer ($t_q$) expires, the leader node checks, in a step or module 745, if one of the plurality of leader nodes (referred to as a "transfer leader node") has provided a transfer response to accept the transfer. If the answer is no, the method 700 returns to the step or module 710, otherwise the leader node receives the transfer response from the transfer leader node including an identifier ("ID") of the transfer leader node of the new group of nodes and/or other information. The transfer leader node will also keep the information about and reserve a place for the candidate member node.

At the step or module 750, the leader node initiates the transfer by sending a transfer instruction to the candidate member node including the ID of the transfer leader node and new group of nodes, and communication endpoints (e.g., IP address). The communication endpoints refer to the address that can be used for the communication between the candidate member node and other entity. Because the nodes, in general, usually only have such information of the member nodes in the group of nodes. For the member nodes in another group of nodes, the communication endpoint is needed in the initial communication. If Internet Protocol ("IP") is used as the transport protocol, IP address (IPv4 or IPv6) could be the endpoint. If other transport protocols are used, the endpoint may be in different format. The candidate member node then sends a join message to the transfer leader node at a step or module 755.

Upon receiving the join message, the transfer leader node compares the information in the join message to previously stored information about the candidate member node. If the information matches and/or is correct, the transfer leader node sends a confirmation to the candidate member node to confirm that the candidate member node has joined the new group of nodes at a step or module 760. The candidate member node then sends a leave message, in a step or module 765, to the leader node to leave that group of nodes, and the transfer is complete and indicated by an end step or module 770.

The solution introduced herein modifies group membership dynamically in real time in response to changing conditions of nodes and networks, and responds automatically in a data processing system (e.g., a distributed data processing system). It may use a hierarchical structured membership management according to selected real-time properties or conditions of the data processing system. These properties or conditions may be represented as a cost map that is updated continually/dynamically. Each group of nodes then periodically/continually checks the cost map and decides if membership should be modified according to a pre-defined criterion.

Figure 8:
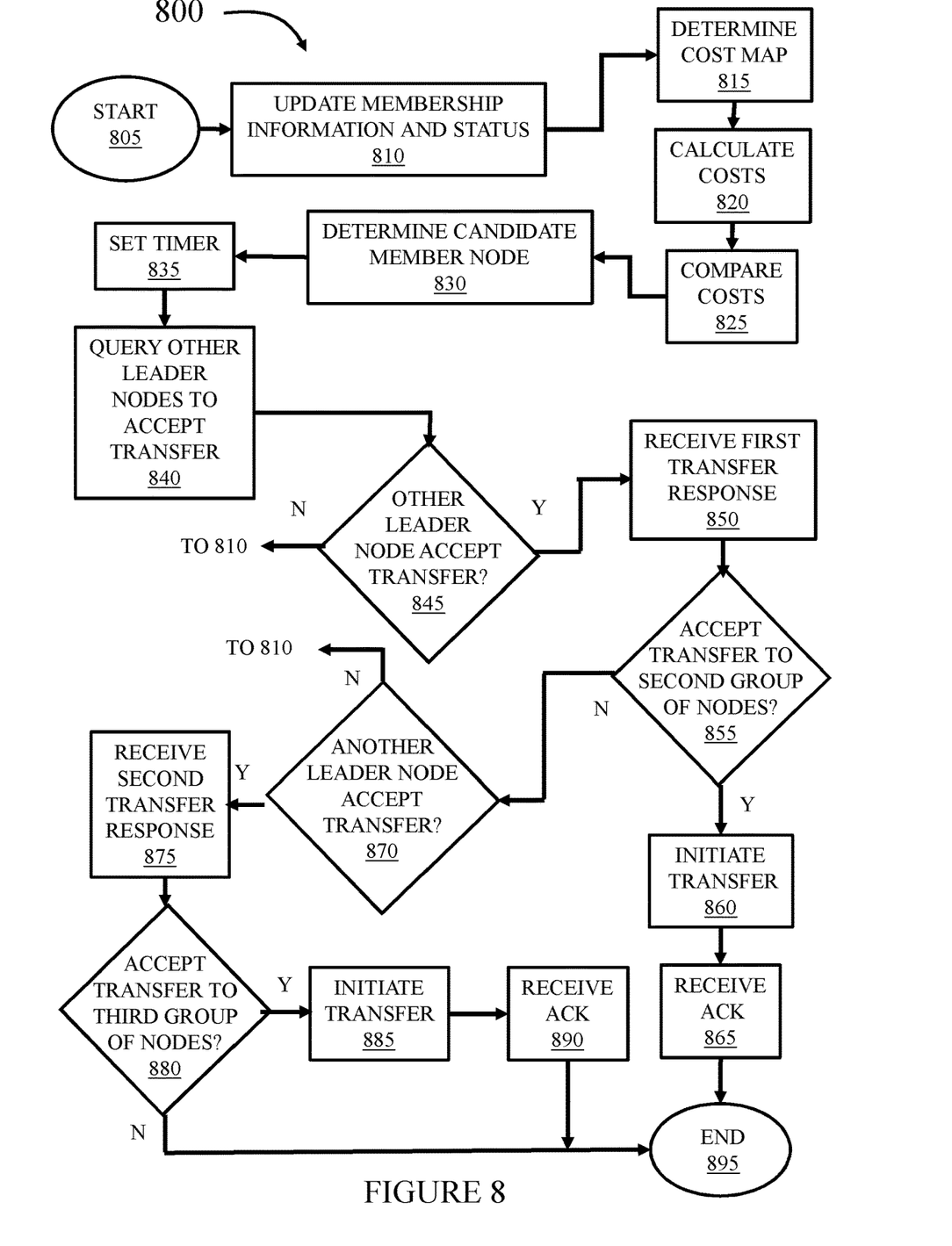

Turning now to FIG. 8, illustrated is a flow diagram of an embodiment of a method 800 of operating a data processing system (e.g., distributed data processing system 300). With continuing reference to the preceding FIGUREs for purposes of illustration, the method 800 is operable in a leader node (e.g., a first leader node 320, 600 including processing circuitry 610) of a group of nodes (e.g., a first group of nodes 310) in communication with a plurality of leader nodes (e.g., second and third leader nodes 350, 380) for a transfer of a candidate member node (e.g., a candidate member node 330A) of member nodes (e.g., first member nodes 330) from the first group of nodes. The first leader node may also be a member of another group of nodes (e.g., another group of nodes 395) in a higher layer of the distributed data processing system. The method 800 begins at a start step or module 805, and then the first leader node updates membership information and status for the first member nodes within the first group of nodes at a step or module 810. At a step or module 815, the first leader node determines a cost map including computational and/or communication costs within the first group of nodes. The cost map may take into account a network topology of the distributed data processing system.

At a step or module 820, the first leader node calculates costs between the first leader node and first member nodes within the first group of nodes based on the cost map. The costs include, without limitation, communication costs between the first leader node and the first member nodes, physical proximity between the first leader node and the first member nodes, and hardware similarity between the first leader node and the first member nodes. The first leader node compares the costs between the first leader node and first member nodes at a step or module 825. The first leader node then determines the candidate member node from the first member nodes if the costs between the first leader node and the candidate member node exceeds a threshold at a step or module 830. The determination may be based on a size of the first group of nodes.

At a step or module 835, the first leader node sets a timer and, in conjunction therewith, queries the plurality of leader nodes (other leader nodes) to accept a transfer of the candidate member node at a step or module 840. The query may include an identifier for the candidate member node and the costs. When the timer expires, the first leader node determines if any of the plurality of leader nodes accepts the transfer (e.g., checks for a transfer response(s)) at a decisional step or module 845. If the first leader node does not receive a transfer response(s), the method 800 returns to the step or module 810. Otherwise, during the pendency of the timer, the first leader node receives a first transfer response from a second leader node of the plurality of leader nodes to accept the transfer of the candidate member node to another group of nodes (e.g., the second group of nodes 340) directed by the second leader node at a step or module 850. The second leader node may take into account costs and ease of adaptation to transfer the candidate member node to the second group of nodes.

At a decisional step or module 855, the first leader node decides whether to accept the transfer of the candidate member node to the second group of nodes. If the first leader node decides not to accept the transfer of the candidate member node to the second group of nodes, the method transitions to the decisional step or module 870. Otherwise, the first leader node initiates a transfer of the candidate member node to the second group of nodes at a step or module 860. The candidate member node may provide a join message to the second leader node to facilitate the transfer. The first leader node thereafter receives an acknowledgement ("ACK") of the transfer of the candidate member node to the second group of nodes at a step or module 865. The method thereafter ends at a step or module 895.

Assuming that the first leader node did not to accept the transfer of the candidate member node to the second group of nodes, the first leader node determines if any other of the plurality of leader nodes accepts the transfer (e.g., checks for a transfer response(s)) at the decisional step or module 870. If the first leader node did not receive any other transfer response(s), the method 800 returns to the step or module 810. Otherwise, during the pendency of the timer, the first leader node receives a second transfer response from a third leader node of the plurality of leader nodes to accept the transfer of the candidate member node to another group of nodes (e.g., the third group of nodes 370) directed by the third leader node at a step or module 875.

At a decisional step or module 880, the first leader node decides whether to accept the transfer of the candidate member node to the third group of nodes. If the first leader node decides not to accept the transfer of the candidate member node to the third group of nodes, the method ends at a step or module 895. Otherwise, the first leader node initiates a transfer of the candidate member node to the third group of nodes (e.g., in conjunction with a join message to the third leader node from the candidate member node) at a step or module 885, and receives an acknowledgement ("ACK") of the transfer of the candidate member node to the third group of nodes at a step or module 890. The method thereafter ends at a step or module 895.

While the method 800 described two of the plurality of leader nodes accepting the transfer, it should be understood that more or less leader nodes may provide a transfer response to accept a transfer to the respective group of nodes. Also, in the event that the leader node receives multiple transfer responses, it may select the transfer leader node based on different criteria such as a first-come first-served basis, randomly, or based on comparative costs between the candidate member node and potential transfer leader nodes (e.g., select the transfer leader node with the lowest cost with respect to the candidate member node).

Figure 9:
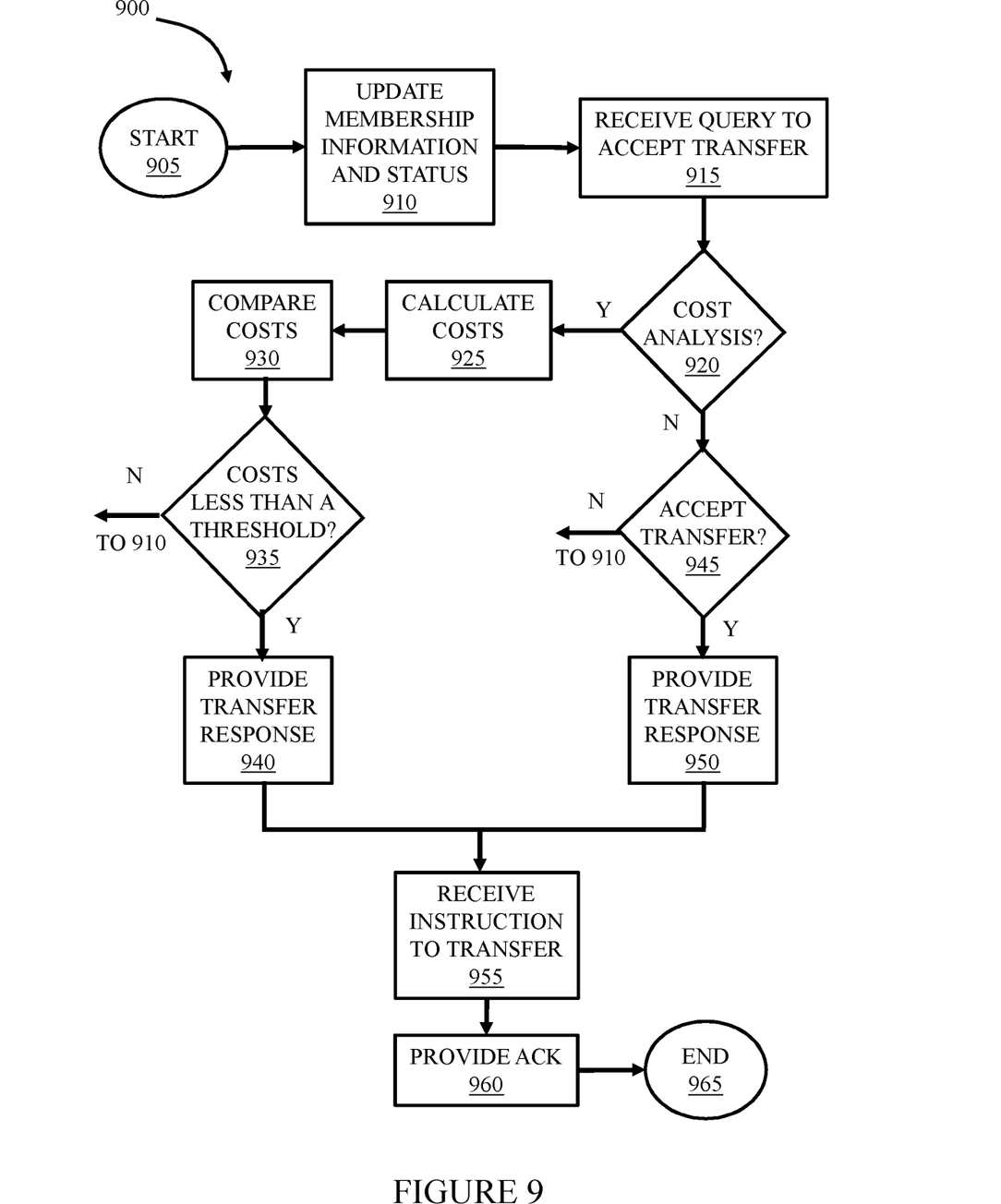

Turning now to FIG. 9, illustrated is a flow diagram of an embodiment of a method 900 of operating a data processing system (e.g., distributed data processing system 400). With continuing reference to the preceding FIGUREs for illustration purposes, the method 900 is operable in a transfer leader node (e.g., a first leader node 420, 600 including processing circuitry 610) of a group of nodes (e.g., a first group of nodes 410) in communication with a leader node (e.g., a second leader node 450) for a transfer of a candidate member node (e.g., candidate member node 460A) of member nodes (e.g., second member nodes 460) from a group of nodes (e.g., second group of nodes 440) to the first group of nodes. The first leader node may also be a member of another group of nodes (e.g., another group of nodes 495) in a higher layer of the distributed data processing system. The method 900 begins at a start step or module 905, and then the first leader node updates membership information and status for member nodes (e.g., first member nodes 430) within the first group of nodes at a step or module 910. At a step or module 915, the first leader node receives a query from the second leader node to accept a transfer of the candidate member node of the second member nodes of the second group of nodes to the first group of nodes. The query may include an identifier for the candidate member node and costs to remain in the second group of nodes.

At a decisional step or module 920, the first leader node decides whether a cost analysis should be performed. If a cost analysis is selected, the first leader node calculates costs of the candidate member node within the first group of nodes based on a cost map including computational and/or communication costs within the first group of nodes at a step or module 925. The costs include, without limitation, communication costs between the first leader node and the candidate member node, physical proximity between the first leader node and the candidate member node, and hardware similarity between the first leader node and the candidate member node. The cost map may take into account a network topology of the distributed data processing system. The first leader node compares the costs between the first leader node and the candidate member node within the first group of nodes at a step or module 930. At a decisional step 935, the first leader node determines if the costs are less than a threshold. The method 900 returns to the step or module 910 if the costs are not less than a threshold. Otherwise, the first leader node provides the transfer response to accept the transfer if the costs between the first leader node and the candidate member node within the first group of nodes are less than the threshold at a step or module 940. The method then transitions to the step or module 955 as set forth below.

If a cost analysis is not selected, the method 900 transitions to a decisional step or module 945 whereupon the first leader node decides whether to accept the transfer. Thus, the first leader node may use other criteria to accept a transfer of the candidate member node to the first group of nodes such as based on a size of the first group of nodes. It should also be understood that the first leader node may use multiple criteria such as, without limitation, the cost analysis and size of the first group of nodes. The first leader node may take into account costs and ease of adaptation to transfer the candidate member node to the first group of nodes. The method 900 returns to the step or module 910 if the first leader node decides not to accept the transfer. Otherwise, the first leader node provides a transfer response to the second leader node if the first leader node accepts the transfer of the candidate member node to the first group of nodes at a step or module 950.

At the step or module 955, the first leader node receives an instruction to transfer the candidate member node to the first group of nodes. The first leader node may receive a join message from the candidate member node to facilitate the transfer of the candidate member node to the first group of nodes. The first leader node provides an acknowledgement ("ACK") of the transfer of the candidate member node to the first group of nodes at a step or module 960. The method thereafter ends at a step or module 965.

Thus, a system and method has been introduced herein to facilitate a transfer of a candidate member node from one group of nodes to another group of nodes in a data processing system. The system and method can be performed in real-time, taking into account multiple criteria, to enhance communication between nodes and groups of nodes within the data processing system.

The foregoing description of embodiments of the present proposed solution has been presented for the purpose of illustration and description. It is not intended to be exhaustive or to limit the proposed solution to the present form disclosed. Alternations, modifications and variations can be made without departing from the spirit and scope of the present proposed solution.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiment can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

The invention claimed is:

1. A method of operating a first leader node of a first group of nodes in communication with a plurality of leader nodes in a distributed data processing system, comprising:
   determining a cost map including computational and/or communication costs within said first group of nodes;
   calculating costs between said first leader node and first member nodes within said first group of nodes based on said cost map;
   determining a candidate member node from said first member nodes if said costs between said first leader node and said candidate member node exceeds a threshold;
   querying said plurality of leader nodes to accept a transfer of said candidate member node;
   receiving a first transfer response from a second leader node of said plurality of leader nodes to accept said transfer of said candidate member node to a second group of nodes directed by said second leader node;
   initiating a transfer of said candidate member node to said second group of nodes if said first leader node accepts said transfer thereto; and
   receiving an acknowledgement of said transfer of said candidate member node to said second group of nodes.

2. The method as recited in claim 1, further comprising continually updating membership information and status for said first member nodes within said first group of nodes.

3. The method as recited in claim 1, further comprising comparing said costs between said first leader node and said first member nodes.

4. The method as recited in claim 1, wherein said costs comprise at least one of communication costs between said first leader node and said first member nodes, physical proximity between said first leader node and said first member nodes, and hardware similarity between said first leader node and said first member nodes.

5. A computer program product comprising a non-transitory computer readable medium storing a computer program comprising instructions, which, when executed by at least one processor, cause the at least one processor to carry out the method according to claim 1.

6. A first leader node of a first group of nodes in communication with a plurality of leader nodes in a distributed data processing system, comprising:
   processing circuitry, configured to:
      determine a cost map including computational and/or communication costs within said first group of nodes;
      calculate costs between said first leader node and first member nodes within said first group of nodes based on said cost map;
      determine a candidate member node from said first member nodes if said costs between said first leader node and said candidate member node exceeds a threshold;
      query said plurality of leader nodes to accept a transfer of said candidate member node;
      receive a first transfer response from a second leader node of said plurality of leader nodes to accept said transfer of said candidate member node to a second group of nodes directed by said second leader node;
      initiate a transfer of said candidate member node to said second group of nodes if said first leader node accepts said transfer thereto; and
      receive an acknowledgement of said transfer of said candidate member node to said second group of nodes.

7. The first leader node as recited in claim 6, wherein said processing circuitry is configured to continually update membership information and status for said first member nodes within said first group of nodes.

8. The first leader node as recited in claim 6, wherein said processing circuitry is configured to compare said costs between said first leader node and said first member nodes.

9. The first leader node as recited in claim 6, wherein said processing circuitry is configured to set a timer and check for said first transfer response when said timer expires.

10. The first leader node as recited in claim 6, wherein said processing circuitry is configured to determine said candidate member node based on a size of said first group of nodes.

11. The first leader node as recited in claim 6, wherein said processing circuitry is configured to initiate said transfer of said candidate member node to said second group of nodes in accordance with a join message to said second leader node from said candidate member node.

12. The first leader node as recited in claim 6, wherein said first leader node is also a member of another group of nodes in a higher layer of said distributed data processing system.

13. The first leader node as recited in claim 6, wherein said query comprises an identifier for said candidate member node and said costs.

14. The first leader node as recited in claim 6, wherein said second leader node takes into account costs and ease of adaptation to transfer said candidate member node to said second group of nodes.

15. The first leader node as recited in claim 6, wherein said cost map takes into account a network topology of said distributed data processing system.

16. The first leader node as recited in claim 6, wherein said processing circuitry is configured to receive a second transfer response from a third leader node of said plurality of leader nodes to accept said transfer of said candidate member node to a third group of nodes directed by said third leader node and said processing circuitry is further configured to either:

initiate a transfer of said candidate member node to said third group of nodes if said first leader node accepts said transfer thereto and receive an acknowledgement of said transfer of said candidate member node to said third group of nodes; or  set a timer and check for said first transfer response and said second transfer response when said timer expires.

17. The first leader node as recited in claim 6, wherein said costs comprise at least one of communication costs between said first leader node and said first member nodes, physical proximity between said first leader node and said first member nodes, and hardware similarity between said first leader node and said first member nodes.

18. A first leader node of a first group of nodes in communication with a second leader node of a second group of nodes in a distributed data processing system, comprising:

processing circuitry, configured to:

receive a query from said second leader node to accept a transfer of a candidate member node of second member nodes of said second group of nodes to said first group of nodes;

provide a transfer response to said second leader node if said first leader node accepts said transfer of said candidate member node to said first group of nodes;

receive an instruction to transfer said candidate member node to said first group of nodes; and   provide an acknowledgement of said transfer of said candidate member node to said first group of nodes  wherein said processing circuitry is further configured to:

calculate costs of said candidate member node within said first group of nodes based on a cost map including computational and/or communication costs within said first group of nodes, and provide said transfer response to accept said transfer if said costs between said first leader node and said candidate member node within said first group of nodes are less than a threshold; and  if said costs between said first leader node and said candidate member node within said first group of nodes are equal to or greater than the threshold, update membership information and status for first member nodes within said first group of nodes.

19. The first leader node as recited in claim 18, wherein said processing circuitry is configured to compare said costs between said first leader node and said candidate member node within said first group of nodes.

20. The first leader node as recited in claim 18, wherein said costs comprise at least one of communication costs between said first leader node and said candidate member node, physical proximity between said first leader node and said candidate member node, and hardware similarity between said first leader node and said candidate member node.

21. A method of operating a first leader node of a first group of nodes in communication with a second leader node of a second group of nodes in a distributed data processing system, comprising:

receiving a query from said second leader node to accept a transfer of a candidate member node of second member nodes of said second group of nodes to said first group of nodes;

providing a transfer response to said second leader node if said first leader node accepts said transfer of said candidate member node to said first group of nodes;

receiving an instruction to transfer said candidate member node to said first group of nodes; and  providing an acknowledgement of said transfer of said candidate member node to said first group of nodes, further comprising either;

calculating costs of said candidate member node within said first group of nodes based on a cost map including computational and/or communication costs within said first group of nodes; and  providing said transfer response to accept said transfer if said costs between said first leader node and said candidate member node within said first group of nodes are less than a threshold and further comprising comparing said costs between said first leader node and said candidate member node within said first group of nodes.

\* \* \* \* \*